United States Patent
Kroeger et al.

(10) Patent No.: US 6,821,100 B2
(45) Date of Patent: Nov. 23, 2004

(54) MULTI-COMPONENT MOLD WITH ROTATABLE MANDRELS

(75) Inventors: Charles Kroeger, Loveland, OH (US); Martel B. Geibel, Jr., Pomona, CA (US)

(73) Assignee: Caco Pacific Corporation, Covina, CA (US)

( * ) Notice: Subject to any disclaimer, the term of this patent is extended or adjusted under 35 U.S.C. 154(b) by 187 days.

(21) Appl. No.: 10/236,499

(22) Filed: Sep. 6, 2002

(65) Prior Publication Data

US 2004/0047933 A1 Mar. 11, 2004

(51) Int. Cl.⁷ .............................................. B29C 45/16
(52) U.S. Cl. .................... 425/112; 425/121; 425/126.1; 425/556; 425/577; 425/588
(58) Field of Search ................................. 425/112, 121, 425/126.1, 556, 576, 577, 588

(56) References Cited

U.S. PATENT DOCUMENTS

| | | |
|---|---|---|
| 3,557,270 A | 1/1971 | Waid |
| 4,201,535 A | 5/1980 | Ninneman |
| 4,243,362 A | 1/1981 | Rees et al. |
| 4,421,705 A | 12/1983 | Hatakeyama et al. |
| 4,422,995 A | 12/1983 | Schad |
| 4,786,455 A | 11/1988 | Krishnakumar et al. |
| 4,969,811 A | 11/1990 | Littleton |
| 5,009,587 A | 4/1991 | Corvaglia et al. |
| 5,123,825 A | 6/1992 | Ernst |
| 5,324,189 A | 6/1994 | Hendry |
| 5,700,500 A | 12/1997 | Wilhelm |
| 5,762,854 A | 6/1998 | Valyi |
| 5,773,049 A | 6/1998 | Kashiwa et al. |
| 5,858,286 A * | 1/1999 | Brown et al. ............... 425/577 |
| 6,217,818 B1 | 4/2001 | Collette et al. |
| 6,386,849 B1 | 5/2002 | Kroeger et al. |
| 6,558,147 B1 * | 5/2003 | Tatsuta et al. ............... 425/577 |
| 6,673,283 B2 * | 1/2004 | Coel et al. .................. 425/150 |

FOREIGN PATENT DOCUMENTS

| | | |
|---|---|---|
| EP | 0117917 A2 | 12/1983 |
| JP | 405245874 | 9/1993 |
| WO | WO9835808 | 8/1998 |
| WO | WO9838021 | 9/1998 |

* cited by examiner

*Primary Examiner*—Jill L. Heitbrink
(74) *Attorney, Agent, or Firm*—Denton L. Anderson; Sheldon & Mak (57) ABSTRACT

A mold apparatus for making multi-component products includes (i) a rotatable turret with a plurality of product connector pairs attached to opposite sides of the turret, (ii) a first mold disposed proximate to the turret and (iii) a second mold disposed on the opposite side of the turret. The first mold has a plurality of cavities for molding a first molded layer of the multi-component product, and the second mold has a plurality of cavities for molding a second layer onto the first molded layer. Each product connector is rotatable about its longitudinal axis to allow the mold apparatus to make multi-component products having first molded layers and second molded layers with indentations and/or protuberances disposed in a variety of orientations.

18 Claims, 9 Drawing Sheets fig.1 fig.2

FIG. 4

MULTI-COMPONENT MOLD WITH ROTATABLE MANDRELS

FIELD OF THE INVENTION

This invention relates generally to molds, and more particularly, to molds capable of forming a multi-component product having a surface with a plurality of protuberances or indentations.

BACKGROUND OF THE INVENTION

Multi-component molded products have become very popular. In a typical molded product, a form or mold cavity is constructed such that the empty space inside the cavity corresponds to the shape of the desired product. Thereafter, molten material, such as plastic, is injected into the cavity, and allowed to cure. In a multi-component mold system, additional components can be added in similar additional stages.

A typical multi-component mold system of the prior art is described in U.S. Pat. No. 6,386,849 which is incorporated herein by this reference in its entirety. Such multi-component system has a turret with multiple pairs of product connection units disposed on opposite sides of the turret. Each product connector is sized and dimensioned to fit into a first mold cavity located proximate to it. After the first components are molded, the turret is rotated 180° and each product connector is inserted into a second mold cavity, after which the molding of the second component occurs. Only the turret, but not the individual product connectors, is capable of rotating about its axis.

Figure 3:
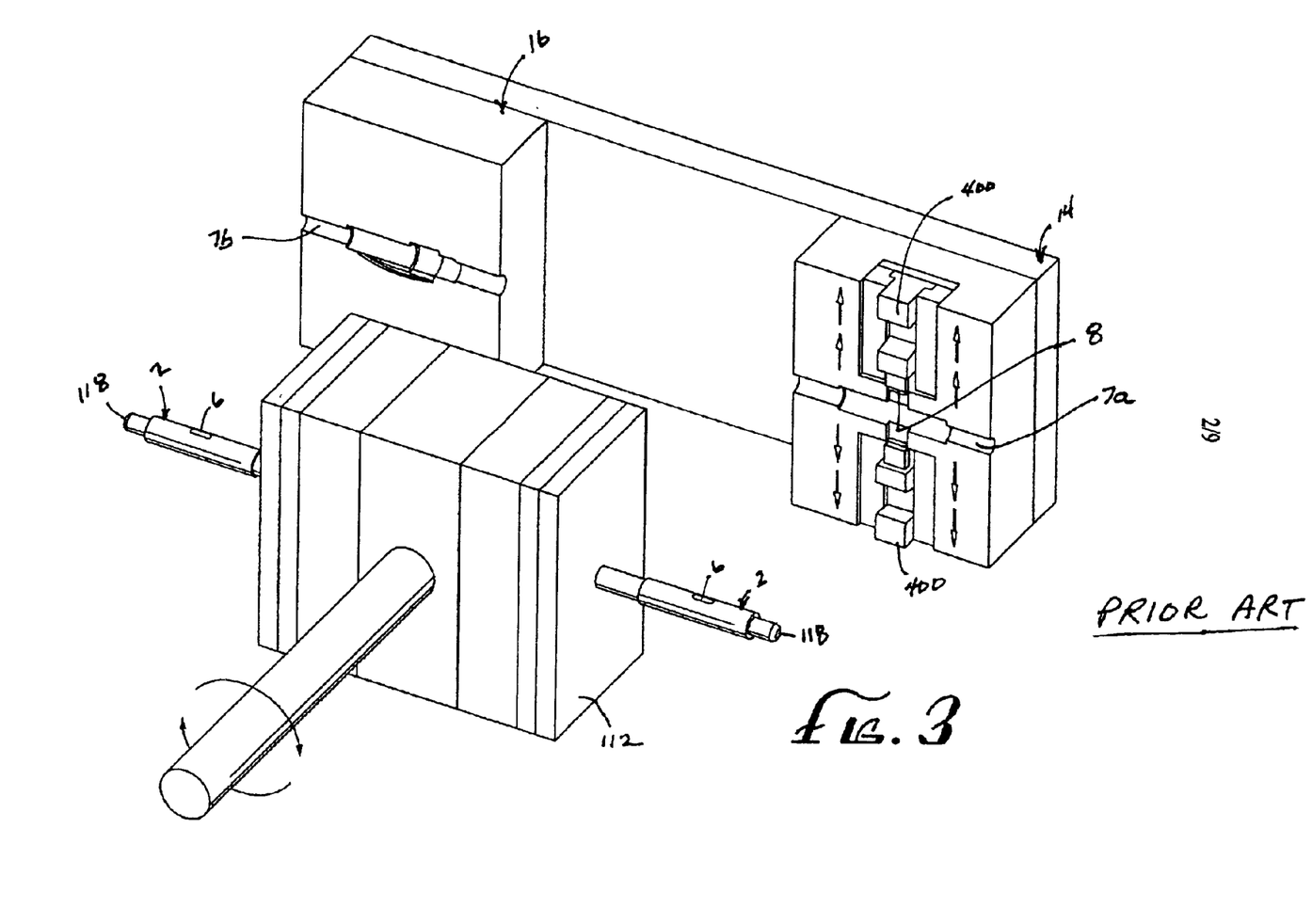
FIG. 3 is a perspective view of a typical slide mechanism useable in mold apparatuses of the prior art.

The problem with such multi-component mold systems of the prior art is that they may not be easily useable to make certain commonly manufactured products. Where the products have surfaces with protuberances or indentations, a typical multi-component system such as illustrated in U.S. Pat. No. 6,386,849 may require additional mechanisms to facilitate the withdrawal of the products from the mold. This situation arises when the protuberances and indentations of the product and of the mold cavity are oriented such that the latter is not able to open without destroying the finished product. The required additional mechanisms use typically complex sliding mechanisms to relieve the entanglement between the protuberances and indentations of the mold cavity and of the finished product. An example of a typical slide mechanism is shown in FIG. 3. Such slide mechanisms are expensive to construct and maintain and add to the cost of the manufacturing of products.

Accordingly, there is a need for a multi-component mold system which avoids these problems with the prior art—in an efficient and relatively inexpensive manner.

SUMMARY

The invention satisfies this need. The invention is an apparatus for making multi-component products. The apparatus comprises (a) an elongate turret having a front side, an opposed rear side and a longitudinal axis, (b) a plurality of elongate product connector pairs, each product connector pair comprising a longitudinal axis, each product connector pair further comprising a forward product connector on the front side of the turret and a rearward product connector on the rear side of the turret, the forward product connector and the rearward product connector being disposed in a plane substantially perpendicular to the longitudinal axis of the turret, each of the product connectors being rotatable about its longitudinal axis, the amount of rotation being between about 10° and about 360°, (c) at least one bearing for permitting the rotation of the turret, (d) a first mold disposed proximate to the turret, the first mold defining a plurality of first mold cavities, each first mold cavity being aligned with a product connector on the turret and each first mold cavity being sized and dimensioned to shape the exterior surface of the first molded portion of the product, the first mold being separable along a first mold separation plane which bisects each of the first mold cavities within the first mold, and (e) a second mold disposed proximate to the turret and opposite the turret from the first mold, the second mold defining a plurality of second mold cavities, each second mold cavity being aligned with a product connector on the turret and each second mold cavity being sized and dimensioned to shape the exterior surface of the second molded portion of the product, the second mold being separable along a second mold separation plane which bisects each of the second mold cavities within the second mold.

DRAWINGS

These features, aspects and advantages of the present invention will become better understood with regard to the following description, appended claims and accompanying figures where:

DETAILED DESCRIPTION

The following discussion describes in detail one embodiment of the invention and several variations of that embodiment. This discussion should not be construed, however, as limiting the invention to those particular embodiments. Practitioners skilled in the art will recognize numerous other embodiments as well.

Figure 1:
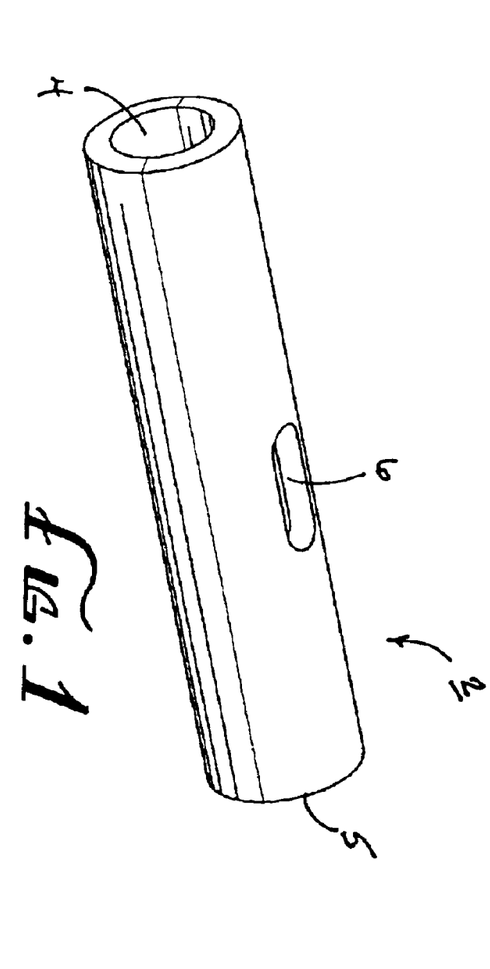
FIG. 1 is a perspective view of a first component of a multi-component product which can be manufactured by the invention.
Figure 2:
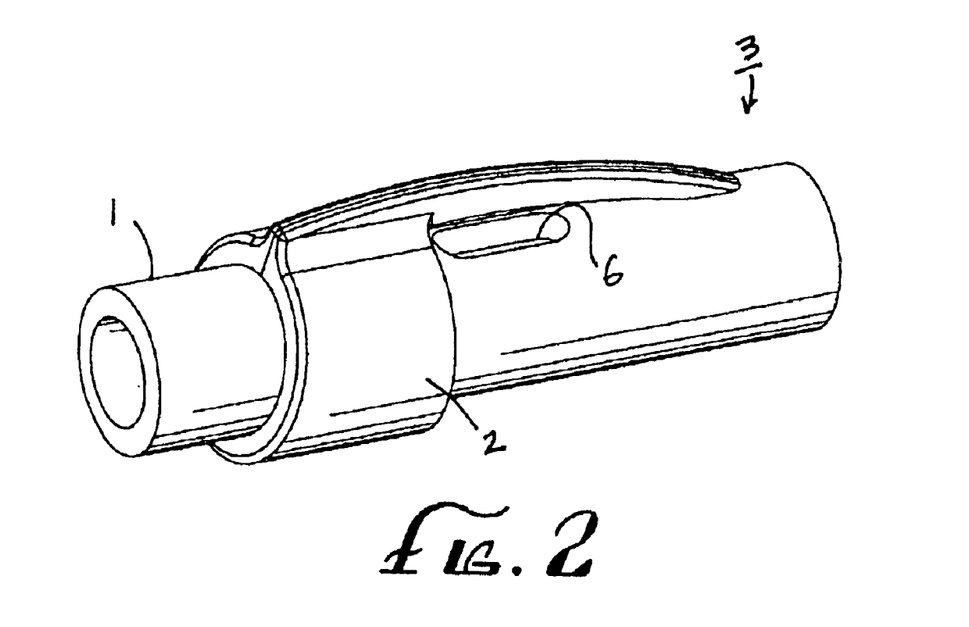
FIG. 2 is a perspective view of a fully completed multi-component product which can be manufactured by the invention.

A typical multi-component product 1 is illustrated in FIGS. 1 and 2. The multi-component product 1 is a hollow cover for a ballpoint pen. The product 1 comprises a first molded layer 2 and a second molded layer 3. The first molded layer 2 has a hollow tubular configuration with an open first end 4 and a closed second end 5. The first molded layer 2 has an oval-shaped first molded layer indentation 6. The second molded layer 3 is disposed over the first molded layer 2 and provides a clip portion of the ballpoint pen cover. The first molded layer 2 and the second molded layer 3 may be molded from plastic materials of differing colors.

As illustrated in FIG. 3, making the first molded layer 2 in a first mold apparatus of the prior art requires at least one mold cavity 7a having a mold cavity protuberance 8 that corresponds to the first molded layer indentation 6. The mold cavity protuberance 8 creates the first molded layer indentation 6 in the first molded layer 2 as injected plastic material within the mold cavity 7a hardens around the mold cavity protuberance 8. If instead of a first molded layer indentation 6 a protuberance is desired on the first molded layer, the mold cavity 7 contains a corresponding mold cavity indentation (not shown). In the embodiment illustrated in the drawings, after the first molded layer 2 is hardened with the mold cavity protuberance 8 disposed within the first molded layer indentation 6, the first molded layer 2 and the mold cavity protuberances 8 must be separable during the opening of the two halves of the mold.

As noted above, the second molded layer 3 is an elongate second molded layer protuberance that will form a clip portion of the pen cover, as illustrated in FIG. 2. As can be seen in FIG. 2, the second molded layer 3 is disposed directly above the first molded layer indentation 6. Making the second molded layer 3 therefore requires a second mold cavity 7b with a mold cavity indentation 11 that corresponds to the second molded layer 3. Like the requirements of the first molded layer 2 in the first mold cavity 7a, the second molded layer 3 must be separable from the second mold cavity 7b during the opening of the second mold.

FIGS. 4-9 illustrate a first typical previously known apparatus for making multi-component products 1. This first previously known typical apparatus 110 comprises an elongate turret 112 disposed between a first mold 114 and a second mold 116. The turret 112 has a plurality of product connector pairs. In the drawings, such product connector 118 within the product connector pairs are mandrels sized and dimensioned to shape the interior cavity of the hollow first molded layer 2, such as illustrated in FIG. 1. The product connectors 118 disposed most proximate to the first mold 114 shall be referred to herein as the first set of product connectors 119, and the product connectors 118 disposed most proximate to the second mold 116 shall be referred to as the second set of product connectors 120.

Figure 8:
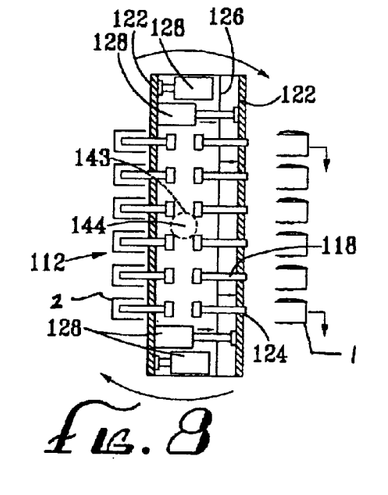
FIG. 8 illustrates the turret shown in FIG. 7 showing the turret rotated 90° and showing the two-component products gravitating away from the turret.

The turret 112 further comprises a pair of opposed stripper plates 122. The stripper plates 122 have apertures 124 to accommodate the product connectors 118. Each of the stripper plates 122 can be extended away from the main body 126 of the turret 112 by means of a pair of stripper plate extension pistons 128 disposed at opposite ends of the turret 112. The stripper plates 122 are used to strip products 1 off of the product connectors 118 as illustrated in FIG. 8.

Figure 4:
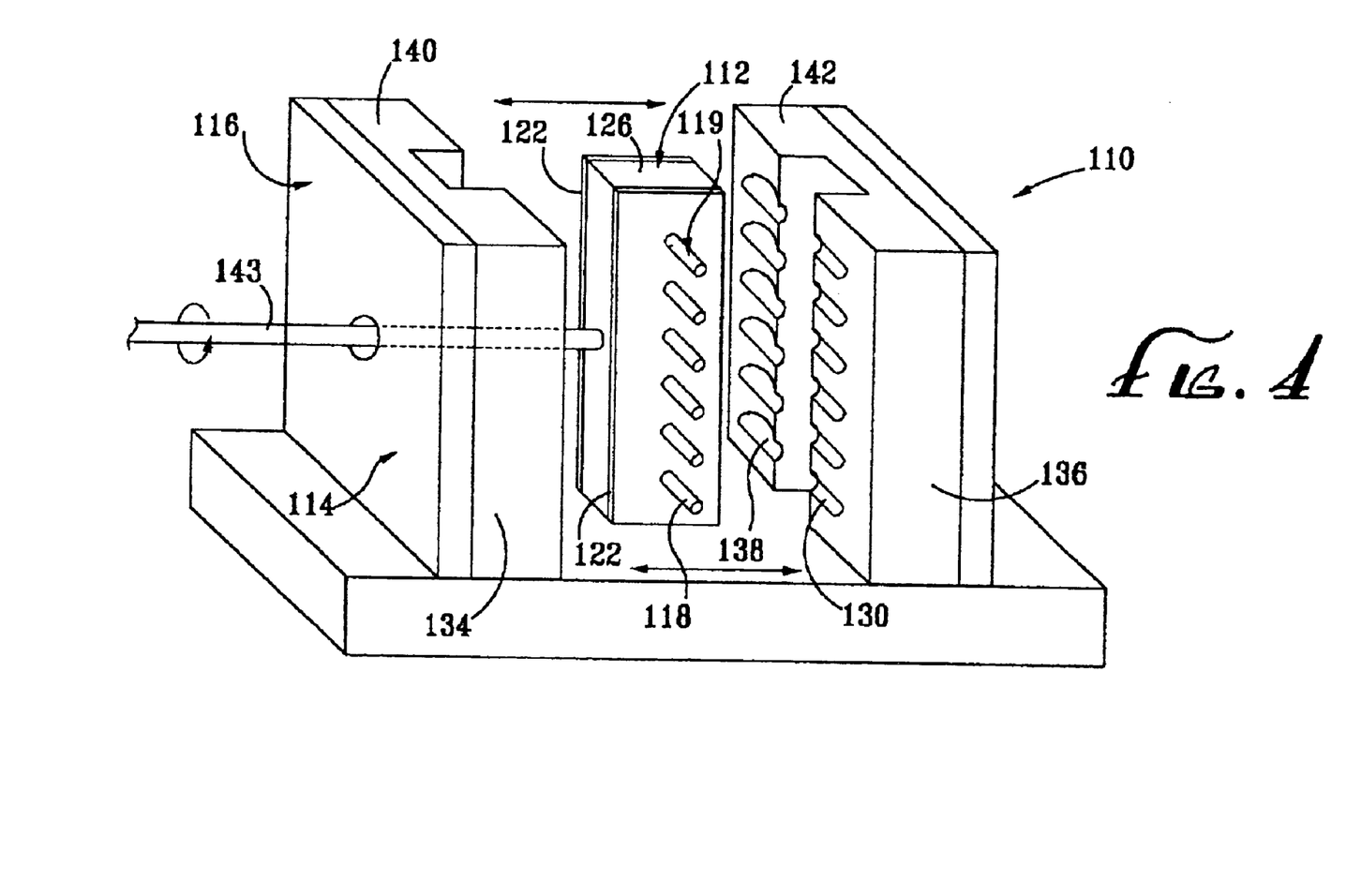
FIG. 4 is a perspective view of a first apparatus for making multi-component products useable in the invention.

The first mold 114 defines a plurality of first mold cavities 130. Each of the first mold cavities 130 is aligned with a product connector 118 on the turret 112. Each of the first mold cavities 130 is sized and dimensioned to shape the exterior surface of the first molded layer 2 of the product 1. The first mold 114 is separable along a mold separation plane 132. In the embodiment illustrated in the drawings, the first mold 114 is separable into a left first mold moiety 134 and a right first mold moiety 136.

The second mold 116 defines a plurality of second mold cavities 138 aligned with product connectors 118 on the turret 112. Each of the second mold cavities 138 is sized and dimensioned to shape the exterior surface of the second molded layer 3 of the product 1. The second mold 116 is separable along the mold separation plane 132 into a left second mold moiety 140 and a right second mold moiety 142.

Figure 5:
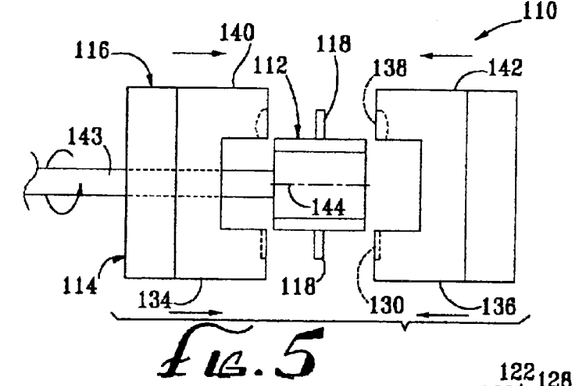
FIG. 5 is a top view of the apparatus illustrated in FIG. 4 showing the molds in the open position.
Figure 6:
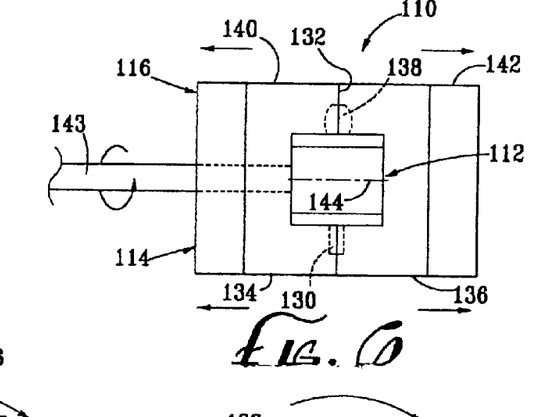
FIG. 6 is a top view of the apparatus illustrated in FIG. 4 showing the molds in the closed position.

The two moieties of both the first mold 114 and the second mold 116 are openable and closeable as illustrated in FIGS. 5 and 6. As can be seen in FIGS. 5 and 6, the first mold 114 and the second mold 116 are openable and closeable by a single opening and closing mechanism, and the first mold separation plane and the second mold separation plane are identical.

The turret 112 is rotatable via a rotatable shaft 143 about the central transverse axis 144 of the turret 112. Because the turret 112 is rotatable, both the first and second sets of product connectors 119 and 120 can be alternatively moved into and out of the first mold 114 and the second mold 116.

Figure 7:
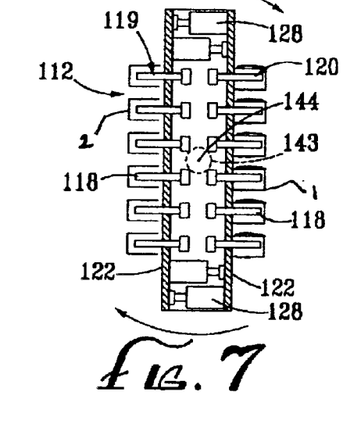
FIG. 7 is a side view of a turret used in the mold illustrated in FIG. 4 showing completed one-component and two-component products appended thereto.
Figure 9:
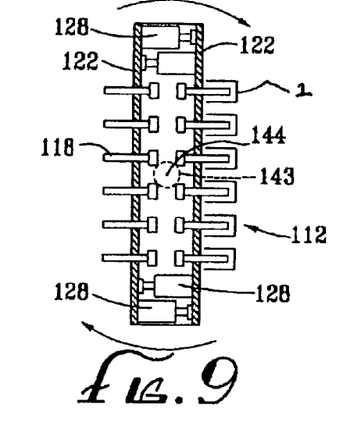
FIG. 9 illustrates the turret shown in FIG. 7 rotated 180° and showing only one-component products attached thereto.

In operation, the first previously known apparatus 110 is moved from the open mold position (illustrated in FIG. 5) to the closed mold position (illustrated in FIG. 6). After moving to the closed position, the first mold cavities 130 wholly encompass the first set of product connectors 119, and the second mold cavities 138 wholly encompass the second set of product connectors 120. Molten plastic is injected into each of the first mold cavities 130. Thereafter, the molds 114 and 116 are separated (as illustrated in FIG. 5) and the turret 112 is rotated 180°. The molds 114 and 116 are then closed again and new molten plastic is injected into the first mold cavities 130 to form additional first molded layers 2 about the second set of product connectors 120. At the same time, different molten plastic is injected into the second mold cavities 138 to create a second molded layer 3 onto each of the previously completed first molded layers 2. This stage in the operation is illustrated in FIG. 7. Next, as illustrated in FIG. 8, the stripper plate 122 proximate to the completed multi-component products 2 is extended to eject completed multi-component products 1 from the first set of product connectors 119. Thereafter, the turret 112 is rotated 180°, as illustrated in FIG. 9. At this point, the first set of product connectors 119 are ready to accept new first molded layers 2 while the second set of product connectors 120 is ready to accept second molded layers 3.

Figure 10:
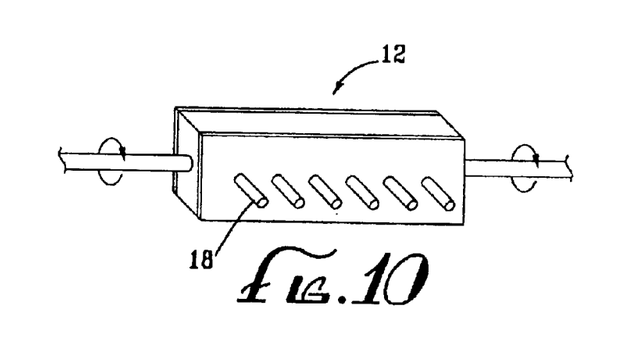
FIG. 10 is a perspective view of a turret useable in a second apparatus for making multi-component products useable in the invention.
Figure 11:
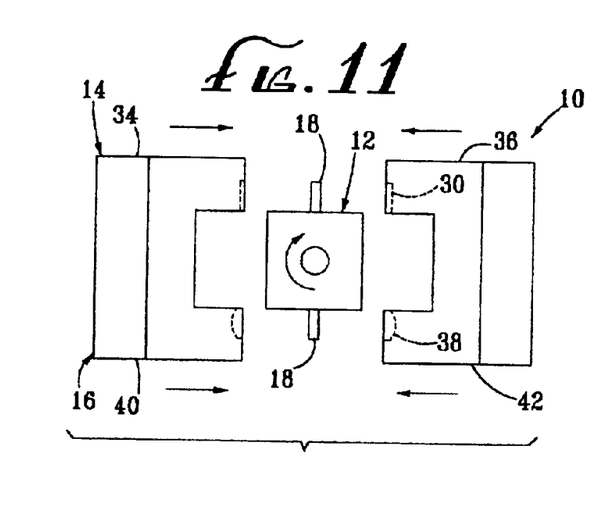
FIG. 11 is a top view of a second mold apparatus for making multi-component products useable in the invention, showing the molds in the open position.
Figure 12:
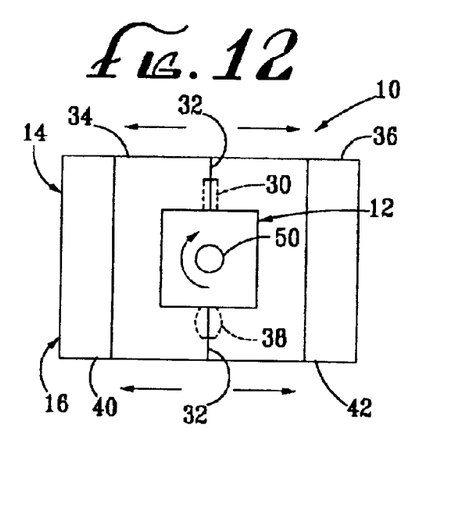
FIG. 12 is a top view of the mold apparatus illustrated in FIG. 11, showing the molds in the closed position.

FIGS. 10-12 illustrate a second typical previously known apparatus 10. This second previously known apparatus 10 also comprises an elongate turret 12 disposed between a first mold 14 and a second mold 16. Like turrets 112 of the first previously known apparatus 110, the turret 12 of the second previously known apparatus 10 also comprises a plurality of product connector pairs. In the drawings, each product connector 18 with the product connector pairs are shown as mandrels which are sized and dimensioned to shape the interior cavity of a hollow first molded layer 2 such as illustrated in FIG. 1. As was the convention in describing the first previously known apparatus 110, the product connectors 18 disposed most proximate to the first mold 12 of the second previously known apparatus 10 shall be referred to herein as the first set of product connectors 19, and the product connectors 18 disposed most proximate to the second mold 16 of the second previously known apparatus 10 shall be referred to as the second set of product connectors 20.

The fundamental difference between the first previously known apparatus 110 and the second previously known apparatus 10 is that, in the second previously known apparatus 10, the turret 12 is rotated about its longitudinal axis 46, rather than about its central transverse axis.

The turret 12 can be disposed vertically or horizontally. In the drawings, the turret 12 is shown as being disposed in a horizontal orientation.

Like in molds used in the first previously known apparatus 110 described above, the first mold 14 used in the second previously known apparatus 10 defines a plurality of first mold cavities 30. Each of the first mold cavities 30 is aligned with a product connector 18 on the turret 12. Each of the first mold cavities 30 is sized and dimensioned to shape the exterior surface of the first molded layer 2 of the product 1. The first mold 14 is separable along a mold separation plane 32. In the embodiment illustrated in the drawings, the first mold 14 is separable into a left first mold moiety 34 and a right first mold moiety 36. Likewise, the second mold 16 of the invention 10 also defines a plurality of second mold cavities 38 aligned with product connectors 18 on the turret 12. Each of the second product cavities 38 is sized and dimensioned to shape the exterior surface of the second molded layer 3 of the product 1. The second mold 16 is separable along the mold separation plane 32 into a left second mold moiety 40 and a right second mold moiety 42. The two moieties of the first and second molds 14 and 16 are openable and closeable as illustrated in FIGS. 10 and 11. As can be seen in FIGS. 10 and 11, the first mold 14 and the second mold 16 are openable and closeable by a single opening and closing mechanism, and the first mold separation plane and the second mold separation plane are identical.

Figures 13, 14:
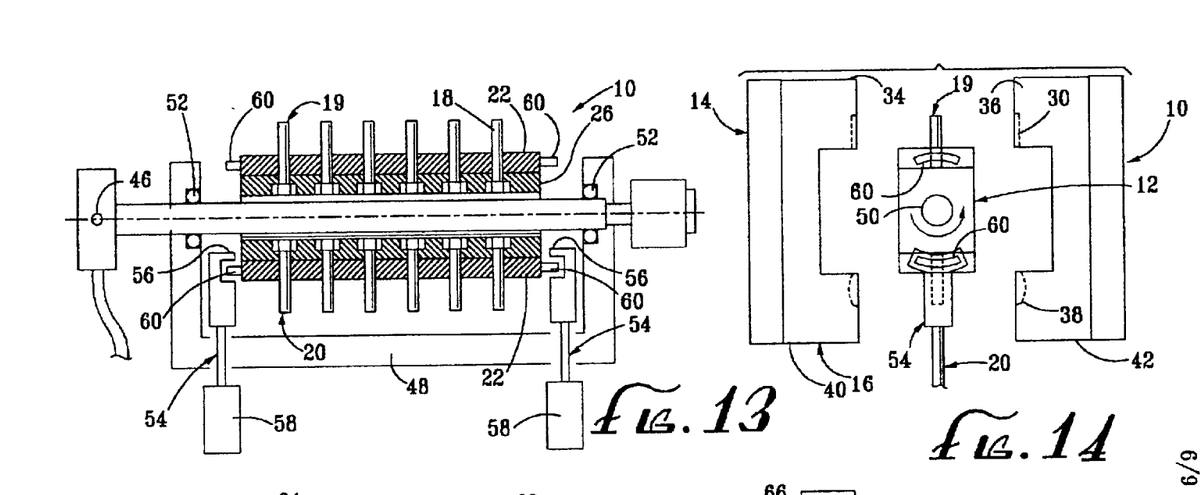
FIG. 13 is a side view in partial cross-section of a first alternative embodiment of the mold apparatus illustrated in FIG. 11.
FIG. 14 is an end view of the mold apparatus illustrated in FIG. 13.

FIGS. 13 and 14 illustrate a first alternative embodiment to the second previously known apparatus 10 illustrated in FIGS. 10-12. In this first alternative embodiment, the turret 12 is disposed on a turret carriage 48. A turret shaft 50 is disposed along the longitudinal axis 46 of the turret 12. The turret shaft 50 is supported at opposite ends by bearings 52 which allow the shaft 50 to rotate about the longitudinal axis 46 of the turret 12.

FIGS. 13 and 14 also illustrate a unique stripper plate extension design useable in the second previously known apparatus 10. In this design, stripper plates 22 disposed on opposite sides of the turret 12 are extended and retracted by opposed stripper plates extender members 54 disposed apart from the turret 12. Typically, the stripper plate extender members 54 will be attached to the turret carriage 48. As illustrated in FIGS. 13 and 14, the stripper plate extender members 54 comprise a hooking flange 56 disposed at the end of a hydraulic cylinder 58. The hooking flange 56 is sized and dimensioned to engage one of two catch members 60 disposed on opposite ends of each stripper plate 22. Upon engaging the catch members 60 of a stripper plate 22 with the stripper plate extender members 54, the stripper plate extender members 54 can be retracted to extend the stripper plate 22 away from the turret 12. The advantage of using this unique stripper plate extension design is that the hydraulic cylinders 58 used to extend the stripper plate extension members 54 are not located within the turret 12, and therefore do not add to the weight of the turret 12. The decreased weight of the turret 12 means a decrease of angular momentum in the rotation of the turret 12.

Figure 15:
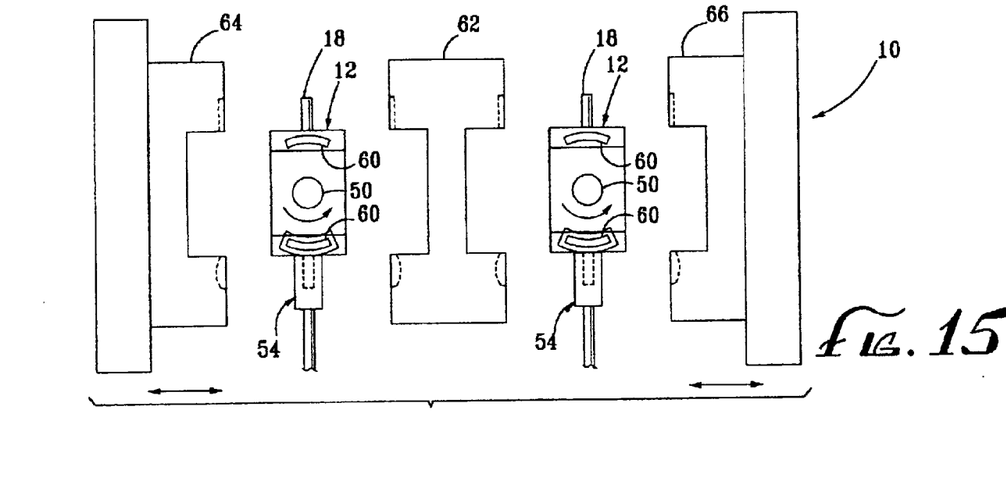
FIG. 15 is a second alternative embodiment of the mold apparatus illustrated in FIG. 11.

FIG. 15 illustrates a second alternative embodiment of the second previously known apparatus 10 illustrated in FIGS. 10-12. In this second alternative embodiment, the apparatus 10 includes in combination a pair of turrets 12 rotatable on either side of a fixed, multi-sided mold member 62 which cooperates with a left side moveable mold member 64 and with a right side moveable mold member 66. As can be seen, the combination of the multi-sided mold member 62 and the left and right side moveable mold members 66 provide four individual molds.

In operation, the first alternative embodiment of the second previously known apparatus 10 is moved from the first mold position (illustrated in FIG. 11) to the closed mold position (illustrated in FIG. 12). After moving to the closed position, the first mold cavities 30 wholly encompass the first set of product connectors 19, and the second mold cavities 38 wholly encompass the second set of product connectors 20. Molten plastic is injected into each of the first mold cavities 30. Thereafter, the molds 14 and 16 are separated (as illustrated in FIG. 11) and the turret 12 is rotated 180°. As the turret 12 is rotated 180°, the stripper plate extender members 54 are extended as illustrated in FIG. 13 so that the catch members 60 are engaged within the hooking flanges 56 on each of the two stripper plate extender members 54. The molds 14 and 16 are then closed again and new molten plastic is injected into the first mold cavities 30 to form additional first molded layers 2 about the second set of product connectors 20. At the same time, different molten plastic is injected into the second mold cavities 38 to create a second molded layer 3 onto each of the previously completed first molded layers 2. Then, the stripper plate extender members 54 are retracted so as to pull downwardly the lowermost stripper plate 22 from the main body 26 of the turret 12. Apertures 24 within the stripper plate 22 allows the stripper plate 22 to extend downwardly along the exterior surfaces of the product connectors 18. By this action, completed multi-component products 1 are stripped from the first set of product connectors 19. Thereafter, the turret 12 is again rotated 180°. At this point, the first set of product connectors 19 are ready to accept new first molded layers 2 while the second set of product connectors 20 is ready to accept second molded layers 3. The turret 12 is continually rotated in the above manner, alternatively producing first molded layers 2 and completed products 1.

A problem arises in the production of the multi-component product 1 illustrated in FIGS. 1 and 2 using the two previously known apparatuses described above. In each such previously known apparatuses, where the mold cavity protuberances 8 in the first mold cavities 30 are oriented in any particular plane, such as oriented in a horizontal plane, the mold cavity indentations in the second mold cavities 38 must necessarily be oriented in that same particular plane. However, mold cavity indentations in the second mold cavities 38 which are oriented in the same particular plane will create second molded layer protuberances which are not easily separable from the second mold 16 upon the opening of the second mold 16. In fact, in order for the second mold layer protuberances 8 to be separable from the second mold 16 upon the opening of the second mold 16, the second mold cavities 38 must be first opened in a plane perpendicular to the movement of the two pairs of mold halves 40 and 42 during the opening of the two molds 14 and 16. Thus, if the mold cavity protuberances 8 in the first mold cavities 30 are oriented in the horizontal and the two pairs of mold halves 34 and 36 open and close in the horizontal, the second mold cavities 38 must be first opened in the vertical before the mold halves 40 and 42 of the second mold 16 can be opened.

FIG. 3 illustrates slide mechanisms 400 of the prior art which provide for such initial openings of the second mold cavities 38 before the two pairs of mold halves 40 and 42 are opened. Complex internal mechanisms (not shown) allow for the controlled sliding apart of the second mold cavities 38 prior to the opening of the two pairs of mold halves 34, 36 and 40, 42. The necessity of such slide mechanisms increases the complexity, weight, capital cost, operating cost and maintenance cost of the two mold combination.

Turning now to the invention which is illustrated in FIGS. 16-19, the apparatus of the invention is a variation of the two previously known apparatuses described above. The invention comprises largely the same components as the two previously known apparatuses illustrated in FIGS. 4-15. The only difference is in the turret 212.

For purposes of illustrating one embodiment of the invention, the invention can be assumed to comprise each of the equipment components of the second previously known apparatus 10 described above, except that the turret 212 is somewhat different.

Like turrets 12 and 112 of the previously known apparatuses, the turret 212 of the invention also comprises a plurality of product connector pairs. In the drawings, the product connectors 218 of the product connector pairs are mandrels, which are sized and dimensioned to shape the interior cavity of a hollow first molded layer 2 such as illustrated in FIG. 1. The fundamental difference between the two previously known apparatuses and the apparatus of the invention is that, in the apparatus of the invention, each product connector 218 is capable of being individually rotated anywhere from 10° to 360° about its longitudinal axis, typically from 30° to 270°, more typically from 60° to 120°, and most typically from 85° to 95°.

Figure 16:
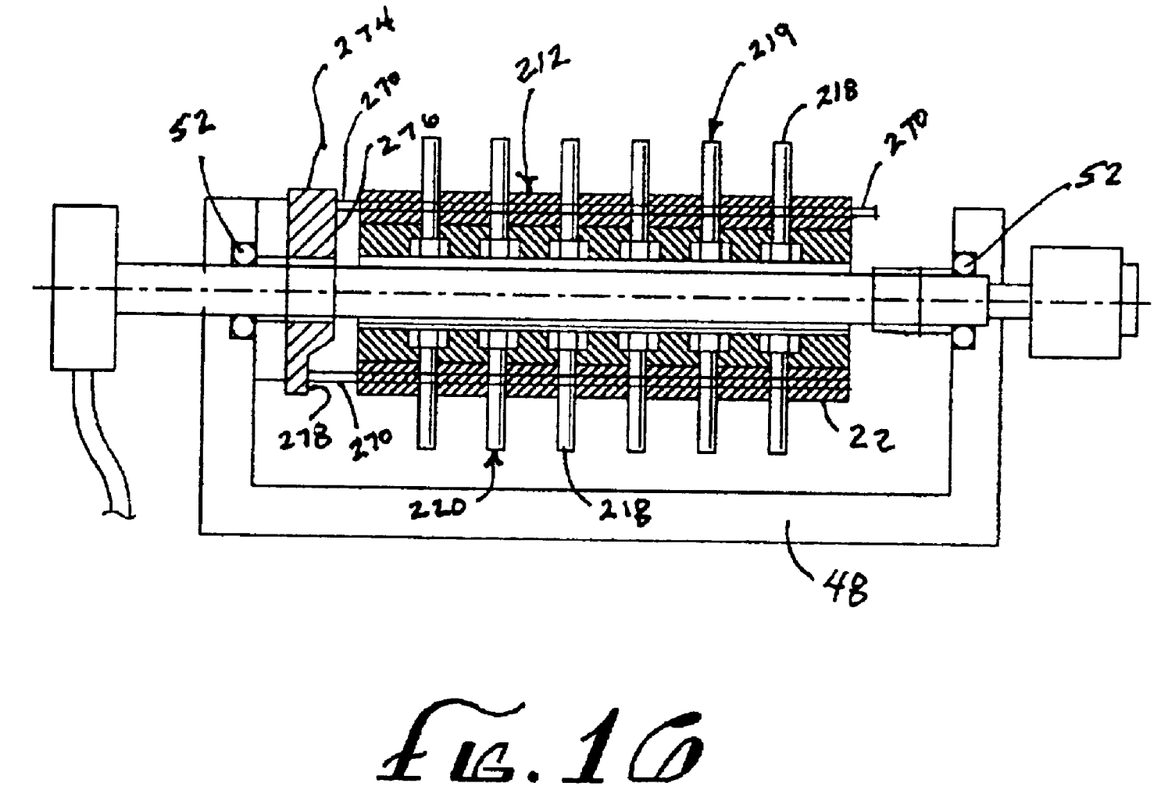
FIG. 16 is a side view in partial cross-section of a mold apparatus useable in the invention.
Figures 17, 18:
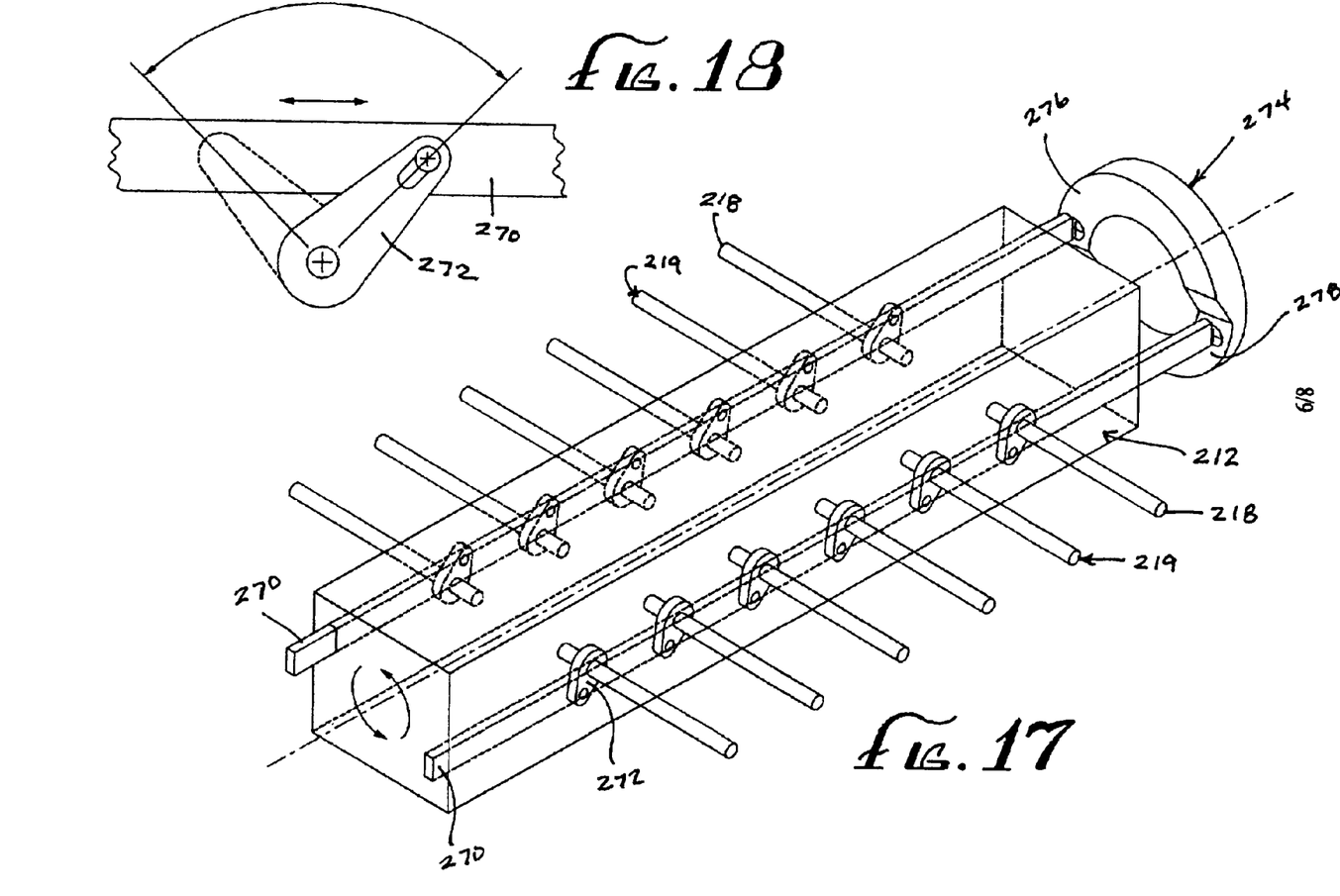
FIG. 17 is a perspective view of a turret useable in the embodiment illustrated in FIG. 16.
FIG. 18 is a detail view of the side of a linkage mechanism useable in the turret illustrated in FIG. 17.

In one embodiment of the invention, illustrated in FIGS. 16-18, each product connector 218 is attached to a push rod 270 by a linkage member 272. Each linkage member 272 is rigidly affixed to a product connector 218 and is rotatably affixed to one of the push rods 270. The push rods 270 are slidably disposed within the turret 212 but extend external of the turret 212 and are in contact with a cam ring 274. The cam ring 274 has a raised portion 276 and a depressed portion 278. Both push rods 270 are biased towards the cam ring 274. Thus, as the turret 212 rotates about its longitudinal axis 46, the cooperation of the push rods 270 and the cam ring 274 cause the push rods 270 to alternatively slide back and forth within the turret 212. As the push rods 270 slide back and forth within the turret 212, they rotate each of the product connectors 218 connected to the push rod 270, first in one direction and then in the other direction. In the embodiment illustrated in the drawings, each push rod 270 acts to rotate its product connectors 218 a total of 90° about the longitudinal axis of each product connector 218.

Figure 19:
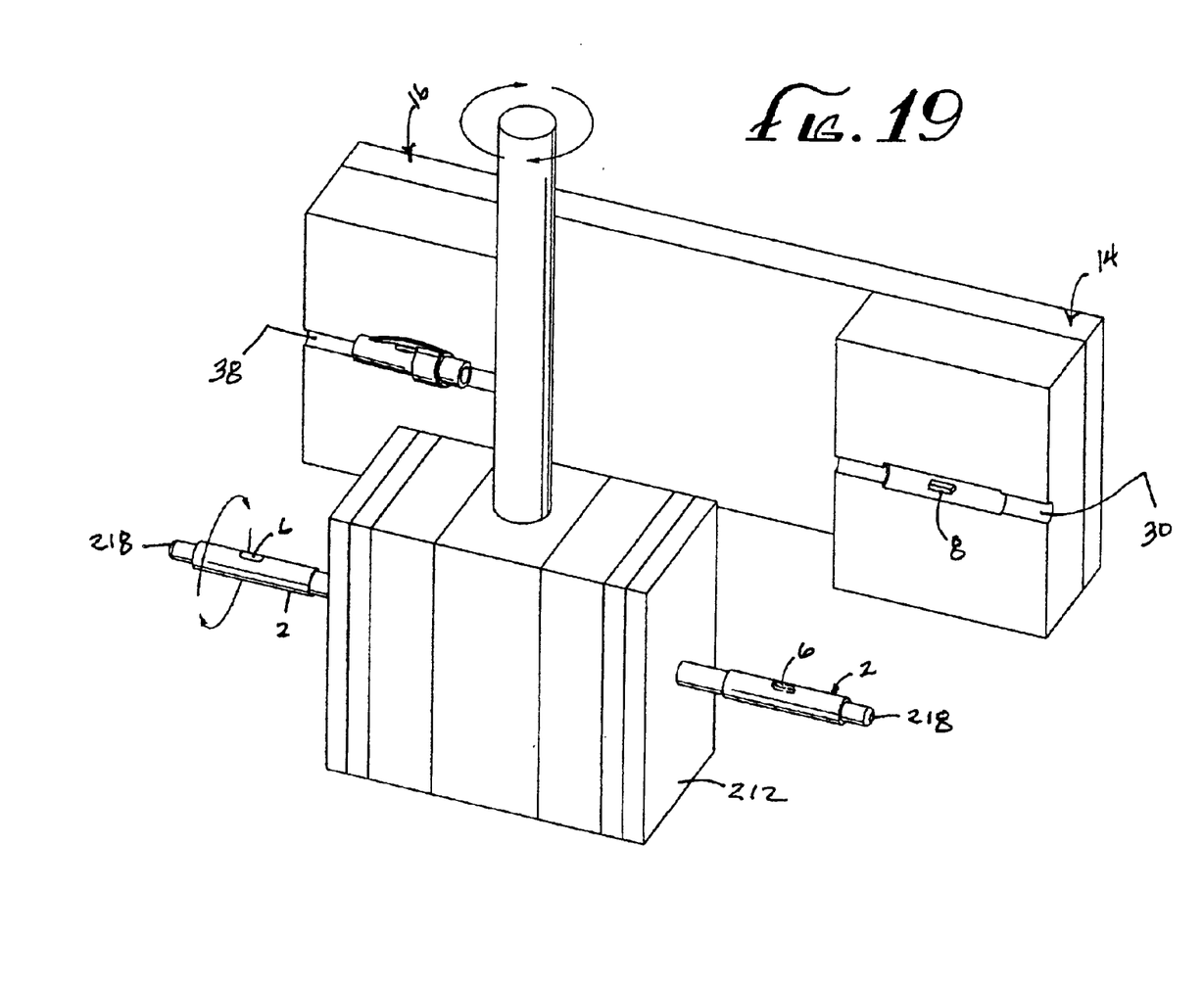
FIG. 19 is a perspective view of a turret and mold half portion useable in the invention.

In operation, the apparatus of the invention is moved from the open mold position to the closed mold position. After moving to the closed position, the first mold cavities 30 and the second mold cavities 38 wholly encompass a first set of product connectors 219 and a second set of product connectors 220, respectively. Molten plastic is injected into each of the first mold cavities 30. The protrusion 8 in each of the first mold cavities 30 is positioned in such a way as to permit the mold 14 to freely open once the plastic hardens. Thereafter, the molds 14 and 16 are separated, and the turret 212 is rotated 180°. As the turret 212 rotates, the cooperation of the push rods 270 against the cam ring 274 causes the push rods 270 to slide within the turret 212. As the push rods 270 slide within the turret 212, they rotate each of the linkage members 272 attached to each of the product connectors 218. As the linkage members 272 rotate, each of the product connectors 218 rotates about its longitudinal axis by 90°. This rotation of the product connectors 218 correctly aligns the first molded layer 2 with respect to the orientation of the second mold cavities 38. This is illustrated in FIG. 19. The molds 14 and 16 are then closed again and new molten plastic is injected into the first mold cavities 30 to form additional first molded layers 1 about the second set of product connectors 220. At the same time, different molten plastic is injected into the second mold cavities 38 to create a second molded layer 3 onto each of the previously completed first molded layers 2. Thereafter, the molds 14 and 16 are again separated, and, the completed multi-component products 1 are ejected from the first set of product connectors 219. Thereafter, the turret 212 is again rotated 180°. Again, as the turret 212 rotates, the cooperation of the push rods 270 against the cam ring 274 cause the push rods 270 to slide within the turret 212. As the push rods 270 slide within the turret 212, each push rod 270 rotates linkage members 272 attached to that push rod 270. As the linkage members 272 rotate, each product connector 218 rotates 90°. At this point, the first set of product connectors 219 is ready to accept new molded layers 2 while the second set of product connectors 220 is ready to accept second molded layers 3. The turret 212 is continually rotated in the above manner, while the molds 14 and 16 alternatively produce first molded layers 2 and completed products 1.

The invention has been found to provide an effective multi-component mold system which avoids the problems of previously known apparatuses.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. An apparatus for making products, each of which products comprises a first molded portion and a second molded portion, the first molded portion having an external surface and an internal surface, the apparatus comprising:
   (a) an elongate turret having a front side, an opposed rear side and a longitudinal axis;
   (b) a plurality of elongate product connector pairs, each product connector pair comprising a longitudinal axis, each product connector pair further comprising a forward product connector on the front side of the turret and a rearward product connector on the rear side of the turret, the forward product connector and the rearward product connector being disposed in a plane substantially perpendicular to the longitudinal axis of the turret, each of the product connectors being rotatable about its longitudinal axis, the amount of rotation being between about 10° and about 360°;
   (c) at least one bearing for permitting the rotation of the turret;

(d) a first mold disposed proximate to the turret, the first mold defining a plurality of first mold cavities, each first mold cavity being aligned with a product connector on the turret and each first mold cavity being sized and dimensioned to shape the exterior surface of the first molded portion of the product, the first mold being separable along a first mold separation plane which bisects each of the first mold cavities within the first mold; and (e) a second mold disposed proximate to the turret and opposite the turret from the first mold, the second mold defining a plurality of second mold cavities, each second mold cavity being aligned with a product connector on the turret and each second mold cavity being sized and dimensioned to shape the exterior surface of the second molded portion of the product, the second mold being separable along a second mold separation plane which bisects each of the second mold cavities within the second mold.

2. The apparatus of claim 1 wherein the product connectors are mandrels sized and dimensioned to shape the interior surface of the first molded portion, each mandrel being disposed perpendicular to the longitudinal axis of the turret.

3. The apparatus of claim 1 wherein each product connector is rotatable in an amount between about 30° and 270°.

4. The apparatus of claim 1 wherein each product connector is rotatable in an amount between about 60° and 120°.

5. The apparatus of claim 1 wherein each product connector is rotatable in an amount between about 85° and 95°.

6. The apparatus of claim 1 further comprising a single opening and closing mechanism for opening and closing both the first mold and the second mold contemporaneously, and wherein the first mold separation plane and the second mold separation plane are identical.

7. The apparatus of claim 1 wherein the turret comprises a pair of elongate push rods slidably disposed within the turret and extending external of one end of the turret, wherein one end of each push rod is disposed in abutment with a cam ring disposed external to the turret, the cam ring having a raised portion and a depressed portion, and wherein each of the product connectors is linked to one of the push rods by a link member such that the sliding movement of each push rod rotates each product connector about the longitudinal axis of the product connector.

8. The apparatus of claim 1 wherein the turret comprises a body having opposed side walls and a pair of stripper plates disposed on opposite sides of the body, each of the stripper plates having a plurality of stripper plate apertures, each of the product connectors being affixed to the body and extending through a stripper plate aperture, each stripper plate being movable between a retracted stripper plate position wherein the stripper plate is proximal to the body and an extended stripper plate position wherein the stripper plate is distal from the body, each stripper plate having at least one stripper plate attachment member, the apparatus further comprising:

at least one stripper plate extender member disposed separate from the turret, the at least one stripper plate extender member being attachable to the at least one stripper plate attachment member on each of the stripper plates, the at least one stripper plate extender member being movable between a first stripper plate extender member position wherein the at least one stripper plate extender member is proximal to the turret and a second stripper plate extender member position wherein the at least one stripper plate extender member is distal from the turret, the at least one stripper plate extender member being alternatively attachable to and detachable from the at least one stripper plate attachment member on each of the two stripper plates, so that, the at least one stripper plate extender member can be (i) moved from the first stripper plate extender member position to the second stripper plate extender member position, (ii) attached to the at least one stripper plate attachment member on one of the two stripper plates, (iii) moved from the second stripper plate extender member position to the first stripper plate extender member position, thereby moving the one of the two stripper plates from the retracted stripper plate position to the extended stripper plate position, (iv) moved from the first stripper plate extender member position to the second stripper plate extender member position, thereby moving the one of the two stripper plates from the extended stripper plate position to the retracted stripper plate position, (v) detached from the at least one stripper plate attachment member, and (vi) returned to the first stripper plate extender member position.

9. The apparatus of claim 8 wherein the apparatus comprises a pair of opposed stripper plate extender members.

10. The apparatus of claim 8 wherein the at least one stripper plate extender member comprises a hooking flange.

11. An apparatus for making products, each of which products comprises a first molded portion and a second molded portion, the first molded portion having an external surface and an internal surface, the apparatus comprising:

(a) an elongate turret having a front side, an opposed rear side and a longitudinal axis;

(b) a plurality of mandrel pairs, each mandrel in each mandrel pair comprising a longitudinal axis, each mandrel pair further comprising a forward mandrel on the front side of the turret and a rearward mandrel on the rear side of the turret, the forward mandrel and the rearward mandrel being disposed in a plane substantially perpendicular to the longitudinal axis of the turret, each of the mandrels being rotatable about its longitudinal axis, the amount of rotation being between about 10° and about 360°;

(c) at least one bearing for permitting the rotation of the turret;

(d) a first mold disposed proximate to the turret, the first mold defining a plurality of first mold cavities, each first mold cavity being aligned with a mandrel on the turret and each first mold cavity being sized and dimensioned to shape the exterior surface of the first molded portion of the product,the first mold being separable along a first mold separation plane which bisects each of the first mold cavities within the first mold;

(e) a second mold disposed proximate to the turret and opposite the turret from the first mold, the second mold defining a plurality of second mold cavities, each second mold cavity being aligned with a mandrel on the turret and each second mold cavity being sized and dimensioned to shape the exterior surface of the second molded portion of the product, the second mold being separable along a second mold separation plane which bisects each of the second mold cavities within the second mold, the second mold separation plane being identical to the first mold separation plane; and (f) a single opening and closing mechanism for opening and closing both the first mold and the second mold contemporaneously.

12. The apparatus of claim 11 wherein each mandrel is rotatable in an amount between about 30° and 270°.

13. The apparatus of claim 11 wherein each mandrel is rotatable in an amount between about 60° and 120°.

14. The apparatus of claim 11 wherein each mandrel is rotatable in an amount between about 85° and 95°.

15. The apparatus of claim 11 wherein the turret comprises a pair of elongate push rods slidably disposed within the turret and extending external of one end of the turret, wherein one end of each push rod is disposed in abutment with a cam ring disposed external to the turret, the cam ring having a raised portion and a depressed portion, and wherein each of the mandrels is linked to one of the push rods by a link member such that the sliding movement of each push rod rotates each mandrel about the longitudinal axis of the mandrel.

16. The apparatus of claim 11 wherein the turret comprises a body having opposed side walls and a pair of stripper plates disposed on opposite sides of the body, each of the stripper plates having a plurality of stripper plate apertures, each of the mandrels being affixed to the body and extending through a stripper plate aperture, each stripper plate being movable between a retracted stripper plate position wherein the stripper plate is proximal to the body and an extended stripper plate position wherein the stripper plate is distal from the body, each stripper plate having at least one stripper plate attachment member, the apparatus further comprising:

at least one stripper plate extender member disposed separate from the turret, the at least one stripper plate extender member being attachable to the at least one stripper plate attachment member on each of the stripper plates, the at least one stripper plate extender member being movable between a first stripper plate extender member position wherein the at least one stripper plate extender member is proximal to the turret and a second stripper plate extender member position wherein the at least one stripper plate extender member is distal from the turret, the at least one stripper plate extender member being alternatively attachable to and detachable from the at least one stripper plate attachment member on each of the two stripper plates, so that, the at least one stripper plate extender member can be (i) moved from the first stripper plate extender member position to the second stripper plate extender member position, (ii) attached to the at least one stripper plate attachment member on one of the two stripper plates, (iii) moved from the second stripper plate extender member position to the first stripper plate extender member position, thereby moving the one of the two stripper plates from the retracted stripper plate position to the extended stripper plate position, (iv) moved from the first stripper plate extender member position to the second stripper plate extender member position, thereby moving the one of the two stripper plates from the extended stripper plate position to the retracted stripper plate position, (v) detached from the at least one stripper plate attachment member, and (vi) returned to the first stripper plate extender member position.

17. The apparatus of claim 16 wherein the apparatus comprises a pair of opposed stripper plate extender members.

18. The apparatus of claim 16 wherein the at least one stripper plate extender member comprises a hooking flange.

* * * * *